(12) United States Patent
Said

(10) Patent No.: US 8,390,677 B1
(45) Date of Patent: Mar. 5, 2013

(54) CAMERA-BASED CALIBRATION OF PROJECTORS IN AUTOSTEREOSCOPIC DISPLAYS

(75) Inventor: Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 424 days.

(21) Appl. No.: 12/498,232

(22) Filed: Jul. 6, 2009

(51) Int. Cl.
*H04N 13/02* (2006.01)
*H04N 13/04* (2006.01)

(52) U.S. Cl. .................. 348/51; 348/46; 348/50

(58) Field of Classification Search .......... None
See application file for complete search history.

(56) References Cited

U.S. PATENT DOCUMENTS

| 5,742,332 | A  | * | 4/1998  | Imai et al. ............ 348/51 |
| 7,133,083 | B2 | * | 11/2006 | Jaynes et al. ......... 348/745 |
| 2004/0240748 | A1 | * | 12/2004 | Matsuda ............... 382/274 |
| 2006/0103932 | A1 | * | 5/2006  | Relke et al. .......... 359/462 |
| 2008/0129894 | A1 | * | 6/2008  | Kang et al. .......... 348/758 |
| 2009/0009593 | A1 | * | 1/2009  | Cameron et al. ....... 348/51 |
| 2009/0115915 | A1 | * | 5/2009  | Steinberg et al. ..... 348/745 |
| 2009/0252419 | A1 | * | 10/2009 | Knee ................... 382/199 |
| 2011/0025832 | A1 | * | 2/2011  | Cowan et al. ......... 348/51 |

FOREIGN PATENT DOCUMENTS

WO   WO-2008/075258 A1 *  6/2008 ............. 353/8

OTHER PUBLICATIONS

Yang, Ruigang et al., "Toward the Light Field Display: Autostereoscopic Rendering via a Cluster of Projectors", *IEEE Trans. Visualization Computer Graphics*, vol. 14, No. 1, (Jan./Feb. 2008),84-96.

* cited by examiner

*Primary Examiner* — Joseph Ustaris
*Assistant Examiner* — Kevin McInnish

(57) ABSTRACT

In a method of calibrating a projector in an autostereoscopic display a projector is used to project an image, comprising a plurality of objects, via a spatial-resolution-to-angular-resolution-converter. The image is received using a camera disposed at the viewer side of the spatial-resolution-to-angular-resolution-converter. It is then determined that a first object of the plurality of objects is not correctly aligned with a second object of the plurality of objects and the first object is re-aligned relative to the second object by generating a command causing the projector to shift the projection of the image relative to the spatial-resolution-to-angular-resolution-converter.

20 Claims, 8 Drawing Sheets

200

START
↓

USING A PROJECTOR TO PROJECT AN IMAGE, COMPRISING A PLURALITY OF OBJECTS, VIA A SPATIAL-RESOLUTION-TO-ANGULAR-RESOLUTION-CONVERTER
210

↓

RECEIVING THE IMAGE USING A CAMERA DISPOSED AT THE VIEWER SIDE OF THE SPATIAL-RESOLUTION-TO-ANGULAR-RESOLUTION-CONVERTER
220

↓

DETERMINING THAT A FIRST OBJECT OF THE PLURALITY OF OBJECTS IS NOT CORRECTLY ALIGNED WITH A SECOND OBJECT OF THE PLURALITY OF OBJECTS
230

↓

RE-ALIGNING THE FIRST OBJECT RELATIVE TO THE SECOND OBJECT BY GENERATING A COMMAND CAUSING THE PROJECTOR TO SHIFT THE PROJECTION OF THE IMAGE RELATIVE TO THE SPATIAL-RESOLUTION-TO-ANGULAR-RESOLUTION-CONVERTER
240

↓

END

FIG. 2

CAMERA-BASED CALIBRATION OF PROJECTORS IN AUTOSTEREOSCOPIC DISPLAYS

BACKGROUND

Autostereoscopic displays of images provide a viewer with three-dimensional depth perception relative to a viewed displayed image, without requiring the use of special apparatus such as glasses with differently colored (e.g. red and green) lenses or polarizing filters. Instead, the stereo qualities are integral to the autostereoscopic display of an image and can thus be seen by human eyes without the use of a special viewing apparatus.

Many mechanisms are known for producing autostereoscopically displayed images and include mechanisms such as flat panel displays and projection screens. Even though mechanisms such as a flat panel display and a projection screen are essentially flat, the produced autostereoscopically displayed image provides a display of an image which affords depth perception to one or more viewers and from multiple viewing angles/locations.

BRIEF DESCRIPTION OF THE DRAWINGS

The accompanying drawings, which are incorporated in and form a part of the Description of Embodiments, illustrate various embodiments of the present invention and, together with the description, serve to explain principles discussed below. The drawings referred to in this Brief Description should not be understood as being drawn to scale unless specifically noted.

FIG. 2 is a flowchart of a method for calibrating a projector in an autostereoscopic display in accordance with one embodiment.

DESCRIPTION OF EMBODIMENTS

Figure 1:
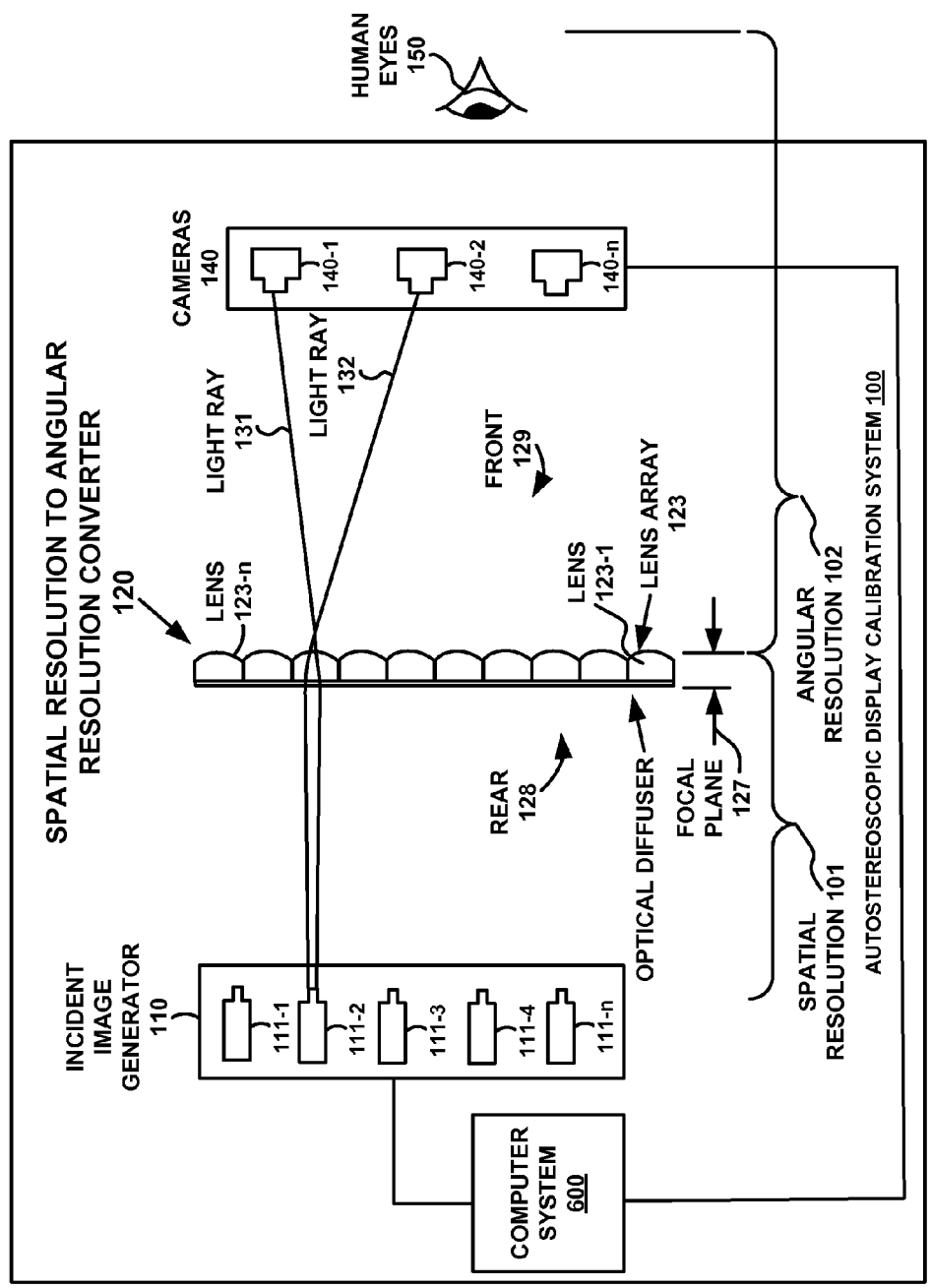
FIG. 1 is a diagram of a system for calibrating a projector in an autostereoscopic display, according to an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments of the subject matter as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "using," "receiving," "determining," "re-aligning," "generating," "assigning," "performing" or the like, refer to the actions and processes of a computer system (such as computer 600 of FIG. 6), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

OVERVIEW OF DISCUSSION

Embodiments described herein provide methods and systems for improving the visual quality of integral imaging autostereoscopic three-dimensional (3-D) displays created via digital projector(s) and a lens array. Due to relatively higher numbers of projectors (e.g., 10 to 100) than are used in other 3-D rendering systems, it is important to calibrate each of the projectors rapidly. Techniques described herein achieve more rapid calibration of projectors used in autostereoscopic 3-D displays.

Discussion will begin with a description of an example autostereoscopic display creation system, which operates to create, display, and in some embodiments calibrate a created autostereoscopically displayed image and/or the system used to create the image. Components of the autostereoscopic display creation system will be described. Discussion will proceed to a description of an example autostereoscopically displayed image and calibration of the projectors thereof. Operation of the autostereoscopic display creation system and its components will then be described in more detail in conjunction with a description of an example method for calibrating a projector in an autostereoscopic display in accordance with various embodiments. Discussion will conclude with a description of an example computer system environment with which, or upon which, some portions or procedures of various embodiments described herein may operate.

Example Autostereoscopic Display Creation System

Referring now to FIG. 1, an autostereoscopic display calibration system 100 is shown. System 100 utilizes a plurality of projected images and a tailored amount of diffusion to project an autostereoscopic image through an array of lenses. System 100 is a lenticular-based autostereoscopic display creation system. In the lenticular-based system, as shown in FIG. 1, an autostereoscopic image is created by projecting an image toward an array of lenses which may be located on a diffuse projection surface (e.g., a backlit screen). The projected image comprises a plurality of light rays which are received at and pass through the rear of the lenses and become light rays which are focused in a region on the front side of the lenses into what human eyes will interpret as an autostereoscopic image with 3-D properties.

Some obstacles faced by conventional lenticular based autostereoscopic displays can result from improper calibration of the projectors comprising incident image generator 110. In particular, the separate images generated by the plurality of projectors comprising incident image generator preferably overlap in a seamless manner to a viewer of the 3-D image. Improper calibration of one or more of the projectors can distort the desired 3-D image.

As shown in FIG. 1, system 100 comprises an incident image generator 110, a spatial-resolution-to-angular-resolution-converter ("converter") 120, and a camera 140. Together these components of system 100 are used to project an autostereoscopically displayed image (not shown) in the angular resolution area 102 in front of converter 120, which can be seen by a pair of human eyes 150 and can also be evaluated by camera 140 for calibrating the projectors comprising incident image generator 110. While FIG. 1 shows a plurality of cameras 140, it is understood that calibrating a projector in an autostereoscopic display in accordance with various embodiments can be performed using only one camera 140. Additionally, a single camera 140 can be moved to facilitate receiving a plurality of autosteroscopically displayed images.

In one embodiment, incident image generator 110 generates a plurality of images having differing incident angles with respect to converter 120. This results in projections of light rays being received at different incident angles from different image projections (112-1 to 112-n). In one embodiment, incident image generator 110 comprises a digital projector 111-1, or a plurality of digital projectors 111-1, 111-2, 111-3, 111-4, through 111-n. In an embodiment where a single digital projector 111-1 of very high resolution is utilized, a projected image is duplicated, such as through the use of mirrors, and is projected a plurality of times from a plurality of different angles toward converter 120. It is appreciated that the resolution of the plurality of projected images is in the nature of spatial resolution in the area 101 between incident image generator 110 and a front 129 of converter 120.

Spatial-resolution-to-angular-resolution-converter 120 receives the plurality of images and creates the autostereoscopically displayed image (not shown) from the plurality of images. In one embodiment, converter 120 comprises a two-dimensional array of small lenses (123-1 to 123-n) which refracts and focuses light rays of incident images 112 to convert the spatial resolution to angular resolution in region 102 extending from the front 129 of converter 120. In some embodiments, converter 120 also includes a diffuser 125 which is optically coupled with lenses 123. As shown in FIG. 1, diffuser 125 is located on the rear side 128 of converter 120, within focal plane 127 of lenses 123 and converter 120, and operates to diffuse light rays of incident images 112 as they pass through converter 120. In this sense, diffuser 125 is behind lenses 123 (between lenses 123 and incident image generator 110) on rear side 128 of converter 120. Diffuser 125 can be comprised of any of a plurality of known diffusing materials which provide a desired and/or selected amount of image diffusion.

In one embodiment, a plurality of the projected images are received at converter 120 at different incident angles from one another. One result of this is that light rays from each of the plurality of projected images strike lenses 123 at different angles and are focused and refracted through each lens 123 (e.g., lens 123-n) at different locations of the surface of each lens 123. This causes a lens surface to be used more efficiently than by one or a plurality of images or light points which strike the lens a common point in a lens (e.g., lens 123-n).

Converter 120 optically converts spatial resolution of a plurality of received incident images to angular resolution by selectively diffusing (which can include not diffusing in some embodiments) and then refracting and focusing the received incident images 112. This conversion takes place within focal plane 127 of converter 120 as the projected images pass through converter 120, and results in the creation an autostereoscopically displayed image which is viewable (on the front side 129 of lenses 123 and converter 120) by human eyes 150 and camera(s) 140. In other words, light generated by different light pixels can follow completely different paths. Similarly, improper calibration of a projector 111 of incident image generator 110 can result in errors in the image received by camera(s) 140.

As shown in FIG. 1, rays of light from a given projector 111-2 hit diffuser 125 at slightly different positions and follow completely different paths after passing through lenses 123. For example, a first light ray 131 passes through converter 120 and is received by camera 140-1 while a second light ray 132 passes through converter 120 and is received by camera 140-2.

In one embodiment, system 100 includes at least one camera 140 which receives an image projected by each of the projectors comprising incident image generator 110. In one embodiment, camera 140 comprises one or more digital cameras which is communicatively coupled with a computer system such as computer system 600 of FIG. 6. In another embodiment, a plurality of cameras (e.g., cameras 140-1, 140-2, and 140-3) are used to receive a plurality of images from projectors of incident image generator 110. In another embodiment, a single camera (e.g., camera 140-1) can be moved to a plurality of positions to receive a plurality of images from projectors of incident image generator 110.

Figure 3A:
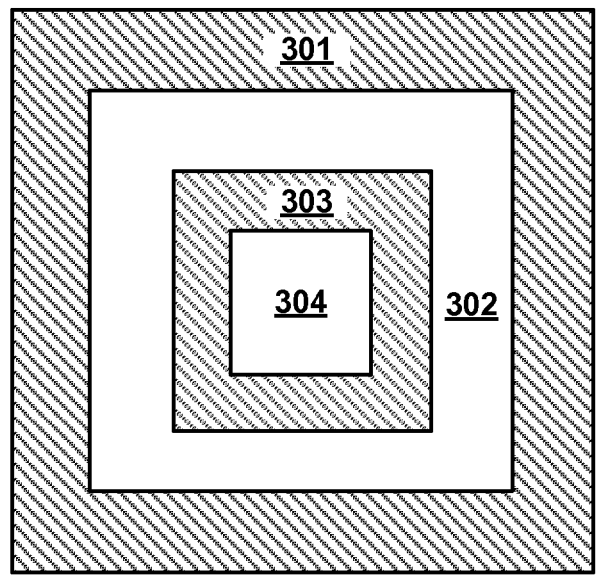
FIGS. 3A and 3B show projected images in an autostereoscopic display system according to various embodiments.
Figure 3B:
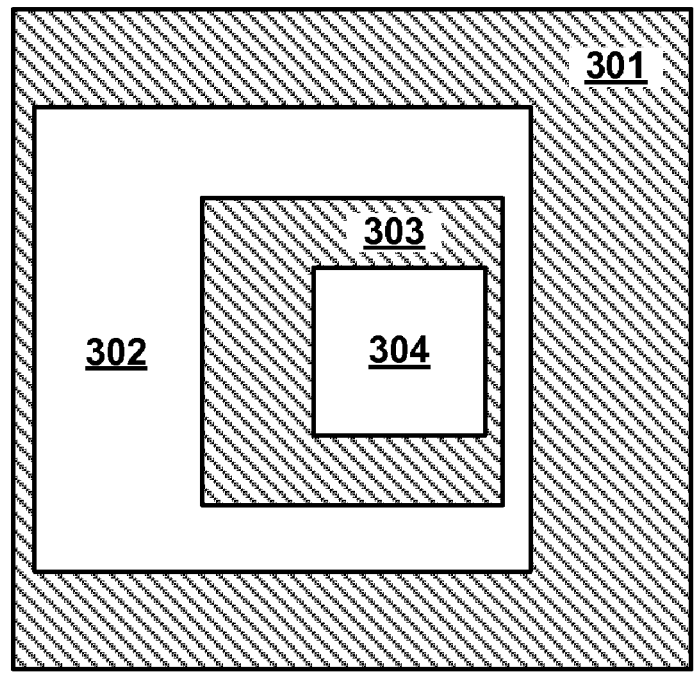
Figure 4:
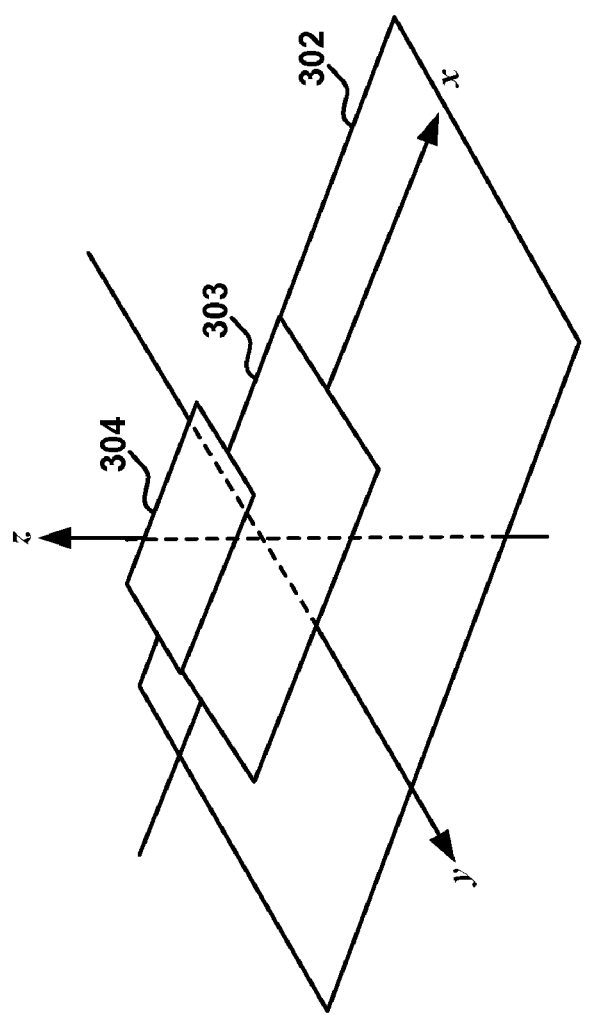
FIG. 4 shows a display coordinate system of the projected images shown in FIGS. 3A and 3B.

FIGS. 3A and 3B show projected images in an autostereoscopic display system according to various embodiments. FIG. 3A shows what is displayed when a "correct" alignment of projectors 111 occurs. In FIGS. 3A and 3B, three squares are displayed as virtual objects which are "floating" in the display space in front of converter 120. A white square 302 is shown in front of a black background 301. A black square 303 is shown nested within white square 302 and another white square 304 is shown nested within black square 303. In FIGS. 3A and 3B, the projected squares are displayed in a 3D display coordinate system in which the X and Y display planes define the horizontal and vertical dimensions respectively and the Z display plane defines the depth of an object (e.g., toward or away from a viewer). FIG. 4 shows in greater detail the display coordinate system described above. In FIG. 4, a positive value in the Z display plane indicates an object which is depicted as being closer to a viewer while a negative value in the Z display plane indicates an object which is depicted as farther away from a viewer.

Returning to FIG. 3A squares 302, 303, and 304 are shown as centered where X and Y coordinates are equal to 0. White square 302 is depicted as being behind the display plane (e.g., Z<0), black square 303 is depicted as being at the display plane (e.g., Z=0), and white square 304 is depicted as being in front of the display plane (e.g., Z>0). FIG. 3B shows the same projected squares from another perspective (e.g., to the left of the position from which FIG. 3A is shown). Due to the offset of square 302, 303, and 304 in the Z axis, the apparent relative alignment of squares 302, 303, and 304 changes due to the different perspectives from which the squares as seen. In other words, as a person moves from a position in the center of the display area (e.g., FIG. 3A) to a position at the left of center (e.g., FIG. 3B), the perspective of the nested squares changes.

However, when even one of projectors 111 is incorrectly registered, a viewer can see similar images from different positions. For example, if one of projectors 111 is incorrectly registered, a viewer at the center of the display area could see the nested squares as shown in FIG. 3B rather than the "correct" view shown in FIG. 3A. Additionally, the viewer could move to the left and see the nested squares as shown in FIG.

3A rather than the view shown in FIG. 3B which would occur if the projector was correctly registered. In other words, incorrect registration of the projector creates a result similar to if the viewer had moved to a different position to view the image. Similarly, a camera (e.g., 140-2) positioned to the left of camera 140-1 may receive the image shown in FIG. 3B while another camera (not shown) positioned to the right of camera 140-1 would receive a mirror image of the image shown in FIG. 3B. It is noted that these same effects can occur even if only one projector is projecting an image. Various embodiments can use this property to register the projectors 111. In one embodiment, registration of projectors 111 is performed individually and sequentially. As an example, projector 111-1 is first registered while projectors 111-2-111-*n* are off. Next, projector 111-2 is registered while 111-1 and 111-3-111-*n* are off.

Example Methods of Operation

The following discussion sets forth in detail the operation of some example methods of operation of embodiments. With reference to FIG. 2, flow diagram 200 illustrates example procedures used by various embodiments. Flow diagram 200 includes some procedures that, in various embodiments, are carried out by a processor under the control of computer-readable and computer-executable instructions. The computer-readable and computer-executable instructions can reside in any tangible computer readable media, such as, for example, in data storage features such as computer usable volatile memory 603, computer usable non-volatile memory 604, peripheral computer-readable media, and/or data storage device 605 (all of FIG. 6). The computer-readable and computer-executable instructions, which reside on tangible computer useable storage media, are used to control or operate in conjunction with, for example, processor 602 of FIG. 6. Although specific procedures are disclosed in flow diagram 200, such procedures are examples. That is, embodiments are well suited to performing various other procedures or variations of the procedures recited in flow diagram 200. It is appreciated that the procedures in flow diagram 200 may be performed in an order different than presented, and that not all of the procedures in flow diagram 200 may be performed.

Example Method of Calibrating an Autostereoscopically Displayed Image

FIG. 2 illustrates a flow diagram 200 of an example embodiment of a method of and calibrating an autostereoscopically displayed image. Elements and procedures of flow diagram 200 are described below, with reference to elements of FIG. 1 and FIGS. 3A and 3B.

In operation 210, a projector is used to project an image, comprising a plurality of objects, via a spatial-resolution-to-angular-resolution converter. In one embodiment, each of projectors 111-1-111-*n* are calibrated separately. In one embodiment, each of projectors 111-1-111-*n* projects the image shown in FIG. 3A. While it is desired that one of more of cameras 140 receives the projected image as shown in FIG. 3A, incorrect calibration of the projector can result in an incorrect image as shown in FIG. 3B. It is noted that other images than those shown in FIGS. 3A and 3B can be used in calibrating an autostereoscopically displayed image in accordance with various embodiments. For the purpose of explanation, the following discussion will assume that projector 111-2 is being calibrated and that camera 140-1 is receiving the image projected by projector 111-2.

In operation 220, the image is received using a camera disposed at the viewer side of the spatial-resolution-to-angular-resolution converter. Again, if projector 111-2 is correctly calibrated, the image shown in FIG. 3A (e.g., where X and Y coordinates equal 0 in the display space coordinate system) should be received by the camera 140-1 if camera 140-1 is also centered at the position where X and Y coordinates equal 0. As described above, one or more cameras 140 can be used in various embodiments. In other words, camera 140-1 can be moved to the positions shown as cameras 140-2 and/or 140-3 as shown in FIG. 1. In one embodiment, the position of the camera(s) receiving the projected image is known. The parameters describing the position of camera 140-1 can include, but are not limited to, the position of camera 140-1 relative to the X, Y, and Z axes of the display coordinate system described with reference to FIG. 4. Additionally, it is understood that the image plane of camera 140-1 is parallel to the display plane described by the X and Y axes of the display coordinate system. In one embodiment, camera 140-1 is centered at the position where X and Y coordinates equal 0. However, the camera 140-1 can be centered at another set of coordinates of the X and Y axes. As a result, the "correct" image for calibrating projector 111-2 may be different that that shown in FIG. 3A. Additionally, in one embodiment computer system 600 may select from a plurality of received images in order to calibrate projector 111-2. For example, if light from projector 111-2 hits the lens array of converter 120 at the junction of two lenses 123, the image received by camera 140-1 may be so distorted that it is difficult for computer system 600 to determine the amount of error in the calibration of projector 111-2. In one embodiment, if computer system 600 determines that a received image is not usable, it can access another received image to determine the calibration of projector 111-2. In a system which uses multiple cameras 140, computer system 600 can simply access the image received by another camera. If only one camera (e.g., 140-1) is being used to calibrate projector 111-2, computer system can generate a message or command to move camera 140-1 to obtain a usable image for calibration.

In operation 230, a determination is made that a first object of the plurality of objects is not correctly aligned with a second object of the plurality of objects. In one embodiment, the image received by camera 140-1 is compared with a "correct" image of what should be received by camera 140-1 if the projector were correctly calibrated. With reference to FIGS. 3A and 3B, the objects used to make this determination are the white and black squares (e.g., 302, 303, and 304). As will be discussed in greater detail below, computer system 600 is configured to analyze the images received by camera 140-1 and determine whether the projector currently projecting the received image is correctly calibrated. In one embodiment, this is accomplished by determining whether squares 302, 303, and 304 are correctly aligned. In other words, it is determined whether parameters describing the alignment of squares 302, 303, and 304 as displayed correspond to expected parameters describing the alignment of squares 302, 303, and 304 if projector 111-2 were correctly calibrated. Thus, if the image shown in FIG. 3B were received by camera 140-1 rather than the expected image as shown in FIG. 3A, squares 302, 303, and 304 will not be correctly aligned. Additionally, computer system 600 is configured to determining a value descriptive of the error in alignment of objects displayed by the projector being calibrated (e.g., projector 111-2).

In operation 240, the first object is re-aligned relative to the second object by generating a command causing the projector to shift the projection of the image relative to the spatialresolution-to-angular-resolution converter. In one embodiment, computer system 600 is configured to determine a value descriptive of the error in alignment of objects displayed by projector 111-2. As a result, computer system 600 can generate a command causing projector 111-2 to shift the projection of the image relative to the spatial-resolution-to-angular-resolution-converter 120. For example, if squares 302, 303, and 304 are mis-aligned (e.g., FIG. 3B), computer system 600 can determine the amount of error and generate a command to projector 111-2 to shift the image by, for example, 1 pixel to the left to compensate for the error. As a result, projector 111-2 will shift the projection by 1 pixel. If the calculated shift of the projected image is correct, camera 140-1 will then receive the image shown in FIG. 3A. If the adjusted image is still incorrect, system 100 will perform an iterative process of adjusting the calibration of projector 111-2 until a satisfactory image is received by camera 140-1.

Determination of Image Alignment

As described above, system 600 is configured to determine whether objects displayed by projector 111-2 are correctly aligned. The evaluation of error can be done using an algorithm that measures the relative position of the nested squares (e.g., 302, 303, and 304 of FIGS. 3A and 3B). Again, it is noted that various embodiments are not limited to the shapes and objects shown in FIGS. 3A and 3B alone. Because embodiments measure the relative positions of squares 302, 303, and 304, it is not necessary to know the image resizing factors of camera 140-1, only the relative position and angle of camera 140-1 relative to the display plane. In one embodiment, image processing techniques such as edge detection followed by a Hough transformation can be used to estimate the edges of squares 302, 303, and 304.

In another embodiment, the luminance of the pixels of camera 140-1 is measured in a manner similar to integration of a function. In other words, each pixel is given a luminance value with a luminance of 0 for black pixels (e.g., background 301 and square 303), and 1 for white pixels (e.g., squares 302 and 304). The edges of the squares are detected by summing the luminance values of all the pixels in a given row or column of pixels and determining whether the sum has changed from the sum of luminance values of a previous row or column. As an example, given a luminance image with pixels $p_{i,j}$ the integral of a given row or column is defined by equation 1:

$$s_{i,j} = s_{i,j-1} + s_{i-1,j} - s_{i-1,j-1} + p_{i,j}$$ (Equation 1)

where p is equal to the luminance of a given pixel, s is the sum of luminance values, i defines the row of the pixel, and j defines the column of the pixel.

As an example, as computer system sums the luminance values of the pixels in the left hand column of FIG. 3A (e.g., of background 301), the sum of luminance values will be 0 due to all of the pixels being black. Each of the succeeding columns of pixels will have a sum of luminance values of 0 as well until the left edge of square 302 is reached. In that column of pixels, the sum of luminance values will increase because of the white pixels of square 302. This jump in the sum of pixel luminance values indicates that an edge of one of the squares has been found. Similarly, as succeeding columns of pixels are evaluated, the sum of luminance values will drop when the left edge of square 303 is reached. Similarly, when the left edge of square 304 is reached, the sum of luminance values for that column will again increase. As succeeding columns of pixels are evaluated, the sum of luminance values will drop when the right edge of square 304 has been passed. The sum of pixel luminance values will increase when the right edge of square 303 has been passed and the sum of pixel luminance values will drop when the right edge of square 302 has been passed.

After identifying the positions of the vertical edges of squares 302, 303, and 304, computer system 600 repeats the process to identify the horizontal edges. In a manner similar to that described above, computer system 600 sums the luminance values of rows of pixels rather than columns. Thus, computer system 600 is configured to determine mis-alignment of squares 302, 303, and 304 in both the vertical and horizontal axes.

Computer system 600 is configured to then determine the how far the received image deviates from the expected image of a correctly calibrated projector. In one embodiment, computer system 600 determines how far the edges of each of squares 302, 303, and 304 are from the center of the display space. As an example, computer system 600 will determine how far the left, right, top, and bottom edges of square 304 are from the center of the display space (e.g., where X and Y coordinates equal 0) to determine whether the squares are correctly aligned. In another embodiment, computer system 600 determines the white/black ratio from the left and right sides of the display as well as the top and bottom of the display to determine whether the squares are correctly aligned. In another embodiment, computer system 600 determines whether a square (e.g., square 302 of FIGS. 3A and 3B) is centered with respect to the square in which it is located (e.g., background 301). Thus, computer system 600 would then determine whether square 303 is centered with respect to square 302 and whether square 304 is centered with respect to square 303. It is again noted that there is no necessity for camera 140-1 to be exactly positioned at the center of the display space (e.g., where X and Y coordinates equal 0). Thus, computer system 600 measures the relative position of squares 302, 303, and/or 304 rather than their size. As a result, it is not necessary to know the image resizing factors of camera 140-1, only its relative position and angle relative to the display plane.

Upon determining the magnitude of error in aligning projector 111-2, computer system 600 determines a value which is estimated to cause projector 111-2 to project the "correct" image when implemented. In other words, computer system 600 determines how much projector 111-2 should shift the projection of an image, relative to converter 120, so that the "correct" image is received by camera 140-1. As an example, computer system 600 can generate a message to projector 111-2 to move the projected image 2 pixels to the left in order to correct the image. It is appreciated that the message can describe the correction applied at projector 111-2 using metrics other than pixels in various embodiments. Additionally, it is noted that the correction can be applied in the vertical and horizontal planes.

In various embodiments, after the correction has been implemented by projector 111-2, computer system 600 will access the adjusted image received by camera 140-1 to verify that projector 111-2 is correctly calibrated. During the second iteration of calibration, computer system 600 can leverage the knowledge of the previous amount of mis-alignment, and the previous adjustment made by projector 111-2 to determine a second adjustment. After determining the change in alignment of objects in the projected display (e.g., squares 302, 303, and 304 of FIGS. 3A and 3B), computer system 600 can correlate that change in alignment with the command previously sent to projector 111-2 to move its projected image. Thus, in the second and, if necessary, subsequent iterations, computer system 600 can more precisely determine how much of an adjustment is to be made by projector 111-2 to generate the "correct" display.

Embodiments of the system described above benefit from having camera 140 disposed in the viewer's side of the display to reflect a viewer's perspective of the display. Additionally, other than some knowledge of the lens lattice shape of lens array 123 (e.g., hexagonal, or rectangular), there is little requirement for computer system 600 to be provided with knowledge regarding converter 120. Another advantage is that changes in the view depend mostly on the position of camera(s) 140. Thus, by using relatively large 3-D objects which create relatively large image features, it is possible to get precise calibration, even with low resolution projectors.

Figure 5A:
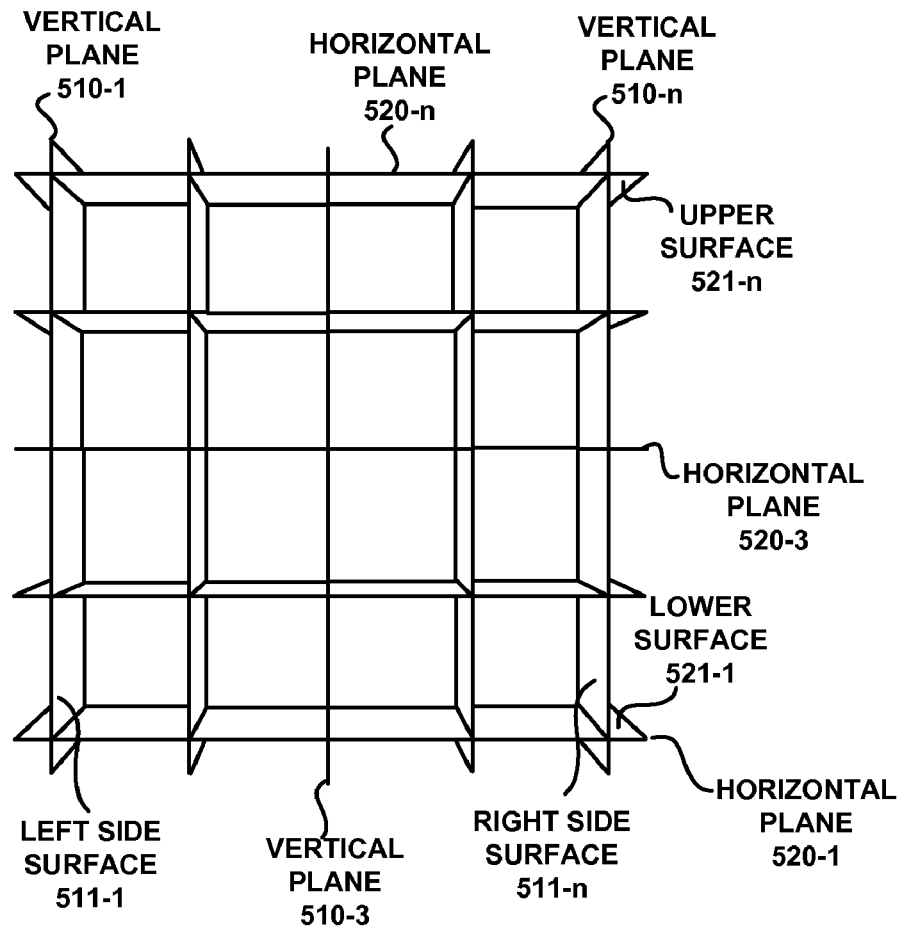
FIGS. 5A and 5B show projected images used for calibrating a projector in an autostereoscopic display according to various embodiments.
Figure 5B:
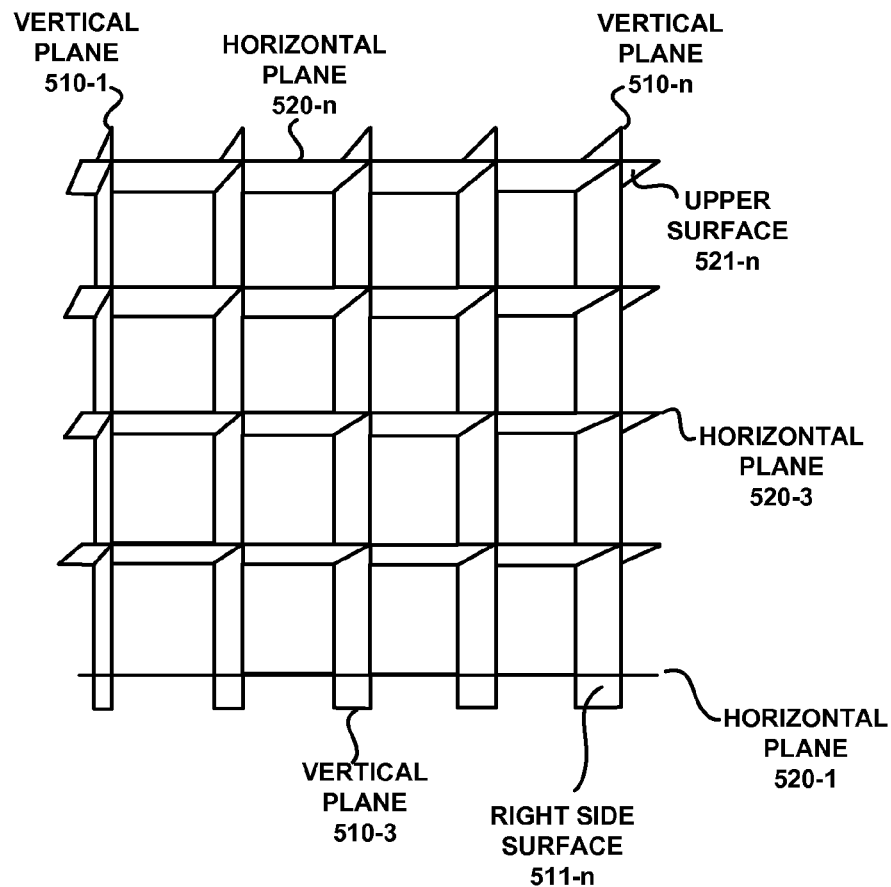

FIGS. 5A and 5B show projected images used for calibrating a projector in an autostereoscopic display according to various embodiments. In FIGS. 5A and 5B, a plurality of planar surfaces are projected by projector 111-2. In FIG. 5A vertical planes 510-1 through 510-n are projected as well as horizontal planes 520-1 through 520-n. FIG. 5A is an example of a "correct" display generated by a correctly calibrated projector and received by a camera which is centered where the X and Y coordinates of the display plane equal 0. In FIG. 5A, this gives an edge-on appearance to vertical plane 510-3 and horizontal plane 520-3. In accordance with various embodiments, the sides of both the vertical and horizontal planes are generated using different colors. For example, lower surface 521-1 can be rendered in blue while upper surface 521-n is rendered in green. This color scheme would apply to all upper and lower surfaces of the horizontal planes. Similarly, left side surface 511-1 can be rendered in red while right side surface 511-n is rendered in yellow. Again, this color scheme would apply to all left side and right side surfaces of the vertical planes.

In various embodiments, computer system 600 will determine the alignment of the planar surfaces by comparing the ratios of colors for the vertical and horizontal planes respectively. Thus, to determine whether the vertical planes are generated with the "correct" alignment, computer system 600 compares the ratio or number of red pixels vs. yellow pixels from the image received by camera 140-1. Similarly, to determine whether the horizontal planes are generated with the "correct" alignment, computer system 600 compares the ratio or number of blue pixels vs. green pixels from the image received by camera 140-1. Referring again to FIG. 5A which is regarded as the "correct" image, the number of red vs. yellow pixels should be approximately equal, or have a 1:1 ratio. Similarly, the number of blue vs. green pixels should be approximately equal, or have a 1:1 ratio. Additional comparison of the colors displayed on the planar surfaces may be made with regard to the background of the displayed image which may be white, black, or another color.

FIG. 5B shows a displayed image which would indicate incorrect calibration of projector 111-2 if camera 140-1 is centered where the X and Y coordinates of the display plane equal 0. As seen in FIG. 5B, the received image is skewed in the vertical and horizontal planes. As a result, neither the right side surfaces, nor the lower surfaces of the vertical and horizontal planes is visible. As a result, the pixel count or ratio of colors will differ significantly from the parameters described above. This indicates that one or more of the vertical planes is not correctly aligned in comparison with other vertical planes and that one or more of the horizontal planes is not correctly aligned in comparison with other horizontal planes. As a result, computer system 600 can determine the direction of mis-alignment as well as some indication of the magnitude of the error in projector calibration. Using this information, computer system 600 can generate a command to projector 111-2 to shift the projection of the image relative to converter 120 to create an image that more closely resembles FIG. 5A.

Example Computer System Environment

Figure 6:
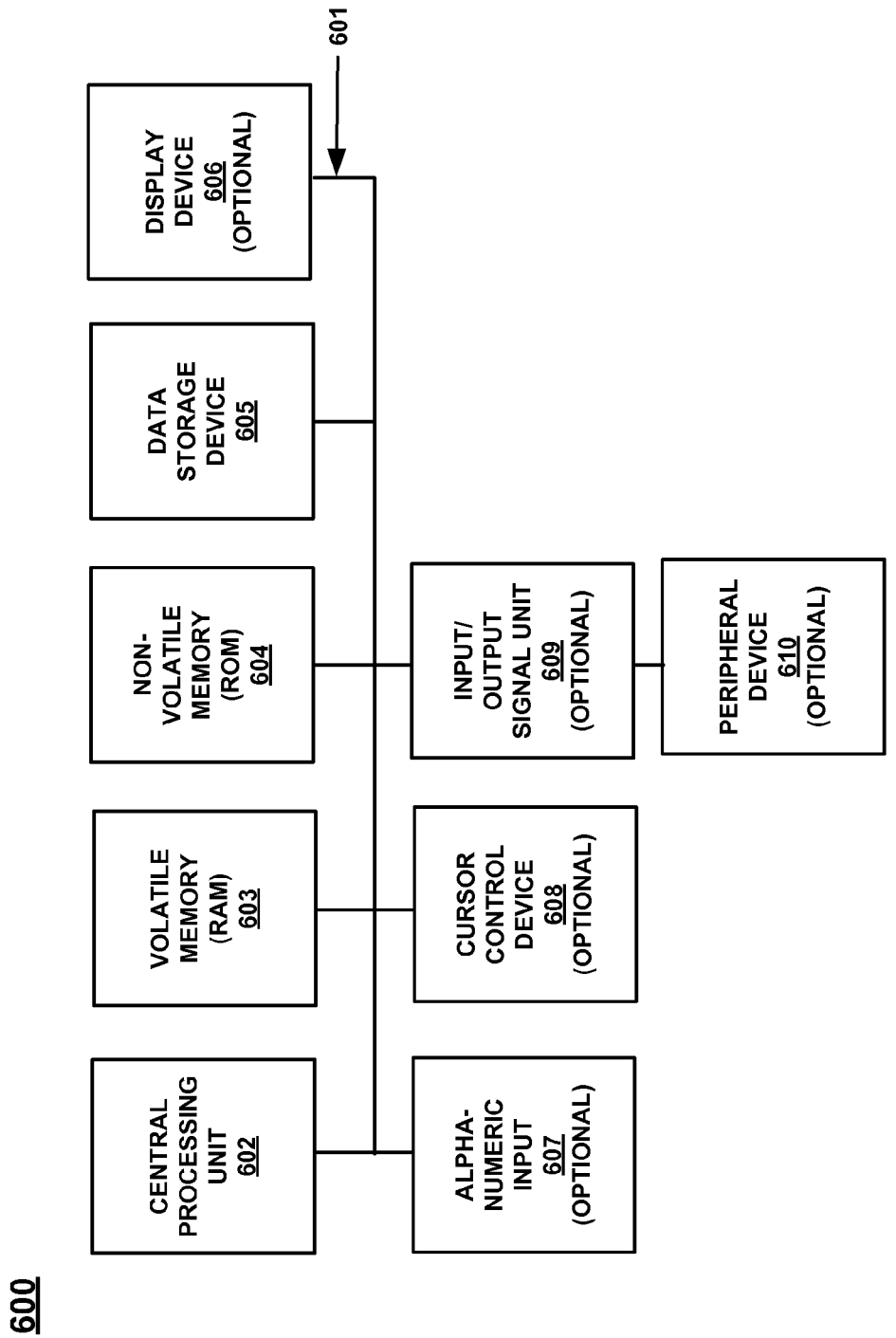
FIG. 6 is a diagram of an example computer system used in accordance with various embodiments.

With reference to FIG. 6, portions of the present technology are comprised of computer-readable and computer-executable instructions that are stored in a computer readable storage medium resident in, for example, a computer system (e.g., computer system 600 of FIG. 1 and FIG. 6). It is appreciated that computer system 600 of FIG. 6 is intended as an example and that the present technology can operate within a number of different computer systems including general-purpose computer systems, embedded computer systems, laptop computer systems, hand-held computer systems, and stand-alone computer systems.

In the present embodiment, computer system 600 includes an address/data bus 601 for conveying digital information between the various components, a central processor unit (CPU) 602 for processing the digital information and instructions including the implementing calibration of a projector in an autostereoscopic display described herein, a volatile main memory 603 comprised of volatile random access memory (RAM) for storing the digital information and instructions, and a non-volatile read only memory (ROM) 604 for storing information and instructions of a more permanent nature. In addition, computer system 600 may also include a data storage device 605 (e.g., a magnetic, optical, floppy, or tape drive or the like) for storing vast amounts of data. It should be noted that the software program for performing the calibration of a projector in an autostereoscopic display in accordance with one embodiment can be stored either in volatile memory 603, non-volatile memory 604, data storage device 605, or in an external storage device (not shown). It is further noted that while described in terms of executable code stored on a computer readable storage medium, in one embodiment the functionality implementing calibration of a projector in an autostereoscopic display, or components thereof, may be implemented as hardware, as a combination of hardware and firmware components, and/or as a combination of hardware and software components of system 600.

Devices which are optionally coupled to computer system 600 include a display device 606 for displaying information to a computer user, an alpha-numeric input device 607 (e.g., a keyboard), and a cursor control device 608 (e.g., mouse, trackball, light pen, etc.) for inputting data, selections, updates, etc. Computer system 600 can also include a mechanism for emitting an audible signal (not shown).

Returning still to FIG. 6, optional display device 606 of FIG. 6 may be a liquid crystal device, cathode ray tube, or other display device suitable for creating graphic images and alpha-numeric characters recognizable to a user. Optional cursor control device 608 allows the computer user to dynamically signal the two dimensional movement of a visible symbol (cursor) on a display screen of display device 606. Many implementations of cursor control device 608 are known in the art including a trackball, mouse, touch pad, joystick, or special keys on alpha-numeric input 607 capable of signaling movement of a given direction or manner displacement. Alternatively, it will be appreciated that a cursor can be directed and/or activated via input from alpha-numeric input 607 using special keys and key sequence commands. Alternatively, the cursor may be directed and/or activated via input from a number of specially adapted cursor directing devices.

Furthermore, computer system 600 can include an input/output (I/O) signal unit (e.g., interface) 609 for interfacing with a peripheral device 610 (e.g., a computer network, modem, mass storage device, etc.). In particular, computer system 600 can be communicatively coupled with incident image generator 110 and with image receiver 140. Additionally, computer system 600 may be coupled in a network, such as a client/server environment, whereby a number of clients (e.g., personal computers, workstations, portable computers, minicomputers, terminals, etc.) are used to run processes for performing desired tasks. In particular, computer system 600 can be coupled in a system for implementing calibration of a projector in an autostereoscopic display.

Referring still to FIG. 6, various other components are not depicted for system 600. Specifically, when present, an operating system, applications, modules, and data are typically residing in one or some combination of volatile memory 603, non-volatile memory 604, and/or data storage device 605. In some embodiments, all or portions of various embodiments described herein are stored, for example, as an application and/or module in memory locations within volatile memory 603, data storage device 605, computer-readable media (not shown) accessed via peripheral device 610, and/or other tangible computer readable media.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims.

What is claimed is:

1. A method of calibrating a projector in an autostereoscopic display, said method comprising:
   using a projector to project an image, comprising a plurality of objects, via a spatial-resolution-to-angular-resolution-converter;
   receiving said image using a camera disposed at a viewer side of said spatial-resolution-to-angular-resolution-converter, wherein said camera is disposed on an opposite side of said spatial-resolution-to-angular-resolution-converter than said projector;
   generating a command to cause said camera to obtain said image from a different position relative to said spatial-resolution-to-angular-resolution-converter, such that said image is usable for calibration, wherein said different position is to provide a different apparent relative alignment of said plurality of objects as viewed from said different position;
   determining that a first object of said plurality of objects is not correctly aligned with a second object of said plurality of objects; and
   re-aligning said first object relative to said second object by generating a command causing said projector to shift the projection of said image relative to said spatial-resolution-to-angular-resolution-converter.

2. The method as recited in claim 1 wherein said re-aligning further comprises:
   generating a first correction value which will correctly align said first object with said second object and which is conveyed in said command.

3. The method as recited in claim 2 wherein said determining that said first object is not correctly aligned with said second object further comprises:
   using a sum of luminance values of a first plurality of pixels to detect a first edge of said first object;
   determining whether said first edge of said first object is correctly displayed within said image;
   using a sum of luminance values of a second plurality of pixels to detect a second edge of said second object;
   determining whether said second edge of said second object is correctly displayed within said image.

4. The method as recited in claim 3 wherein said detecting said first edge and said second edge further comprises:
   determining a sum of a plurality of luminance values selected from the group consisting of a row of pixels and a column of pixels.

5. The method as recited in claim 2 wherein said determining that said first object is not correctly aligned with said second object further comprises:
   assigning a first color value to said first object;
   assigning a second color value to said second object; and
   determining a ratio of pixel color values of said first color value relative to said second color value.

6. The method as recited claim 2 further comprising:
   performing an iterative process in which the alignment of said first object is compared with said second object subsequent to said re-aligning;
   determining a metric descriptive of an error in alignment of said first object; and
   determining a second correction value based upon said first correction value and said metric.

7. The method as recited in claim 1 further comprising:
   receiving a plurality of images of said first object and said second object and wherein said receiving said plurality of images is selected from the group consisting of moving said camera from a first position to a second position to receive said plurality of images and utilizing a plurality of cameras to receive said plurality of images.

8. A system for calibrating a projector in an autostereoscopic display, said system comprising:
   a projector to project an image comprising a plurality of objects;
   a spatial-resolution-to-angular-resolution-converter;
   at least one camera disposed at a viewer side of said spatial-resolution-to-angular-resolution-converter, wherein said camera is disposed on an opposite side of said spatial-resolution-to-angular-resolution-converter than said projector; and
   a processing device, communicatively coupled with said camera and with said projector, to determine that a first object of said plurality of objects is not correctly aligned with a second object of said plurality of objects, to cause said camera to obtain said image from a different position relative to said spatial-resolution-to-angular-resolution-converter such that said image is usable for calibration, wherein said different position is to provide a different apparent relative alignment of said plurality of objects as viewed from said different position, and said processing device to generate a command causing said projector to shift the projection of said image relative to said spatial-resolution-to-angular-resolution-converter to re-align said first object relative to said second object.

9. The system of claim 8 wherein said processing device is further to generate a first correction value which will correctly align said first object with said second object and which is conveyed in said command.

10. The system of claim 9 wherein said processing device is further to detect a first edge of said first object using a sum of luminance values of a first plurality of pixels and to determine whether said first edge of said first object is correctly displayed within said image, and wherein said processing device is further to detect a second edge of said second object using a sum of luminance values of a second plurality of pixels and to determine whether said second edge of said second object is correctly displayed within said image.

11. The system of claim 10 wherein said processing device is to detect said first edge and said second edge by determining a sum of a plurality of luminance values selected from the group consisting of a row of pixels and a column of pixels.

12. The system of claim 9 wherein said processing device is further to assign a first color value to said first object and a second color value to said second object and to determine a ratio of pixel color values of said first color value relative to said second color value.

13. The system of claim 9 wherein said processing device is further to perform an iterative process in which a metric descriptive of an error in alignment of said first object is generated subsequent to said re-aligning and a second correction value is determined based upon said first correction value and said metric.

14. The system of claim 8 wherein said processing device is to receive a plurality of images and wherein said receiving said plurality of images is selected from the group consisting of moving said at least one camera from a first position to a second position to receive said plurality of images and utilizing a plurality of cameras to receive said plurality of images.

15. A non-transitory tangible computer readable storage medium having computer readable code stored thereon for causing a computing device to perform a method of calibrating a projector in an autostereoscopic display, said method comprising:
    using a projector to project an image, comprising a plurality of objects, via a spatial-resolution-to-angular-resolution-converter;
    receiving said image using a camera disposed at a viewer side of said spatial-resolution-to-angular-resolution-converter, wherein said camera is disposed on an opposite side of said spatial-resolution-to-angular-resolution-converter than said projector;
    generating a command to cause said camera to obtain said image from a different position relative to said spatial-resolution-to-angular-resolution-converter, such that said image is usable for calibration, wherein said different position is to provide a different apparent relative alignment of said plurality of objects as viewed from said different position;
    determining that a first object of said plurality of objects is not correctly aligned with a second object of said plurality of objects; and
    re-aligning said first object relative to said second object by generating a command causing said projector to shift the projection of said image relative to said spatial-resolution-to-angular-resolution-converter.

16. The non-transitory tangible computer readable storage medium of claim 15 wherein said re-aligning further comprises:
    generating a correction value which will correctly align said first object with said second object and which is conveyed in said command.

17. The non-transitory tangible computer readable storage medium of claim 16 wherein said determining that said first object is not correctly aligned with said second object further comprises:
    using a first sum of luminance values of a first plurality of pixels to detect a first edge of said first object;
    determining whether said first edge of said first object is correctly displayed within said image;
    using a second sum of luminance values of a second plurality of pixels to detect a second edge of said second object;
    determining whether said second edge of said second object is correctly displayed within said image.

18. The non-transitory tangible computer readable storage medium of claim 17 wherein said determining further comprises:
    determining a sum of a plurality of luminance values selected from the group consisting of a row of pixels and a column of pixels.

19. The non-transitory tangible computer readable storage medium of claim 16 wherein said determining that said first object is not correctly aligned with said second object further comprises:
    assigning a first color value to said first object;
    assigning a second color value to said second object; and
    determining a ratio of pixel color values of said first color value relative to said second color value.

20. The non-transitory tangible computer readable storage medium of claim 15 further comprising:
    receiving a plurality of images of said first object and said second object and wherein said receiving said plurality of images is selected from the group consisting of moving said camera from a first position to a second position to receive said plurality of images and utilizing a plurality of cameras to receive said plurality of images.

* * * * *

UNITED STATES PATENT AND TRADEMARK OFFICE
CERTIFICATE OF CORRECTION

PATENT NO. : 8,390,677 B1
APPLICATION NO. : 12/498232
DATED : March 5, 2013
INVENTOR(S) : Amir Said Page 1 of 1

It is certified that error appears in the above-identified patent and that said Letters Patent is hereby corrected as shown below:

In the Claims:

In column 12, line 18, in Claim 6, delete "recited" and insert -- recited in --, therefor.

Signed and Sealed this
Ninth Day of July, 2013

Teresa Stanek Rea
*Acting Director of the United States Patent and Trademark Office*